Aug. 11, 1925.  F. G. HANBACK  1,549,197
MAGNETIC TOY
Filed Sept. 9, 1924
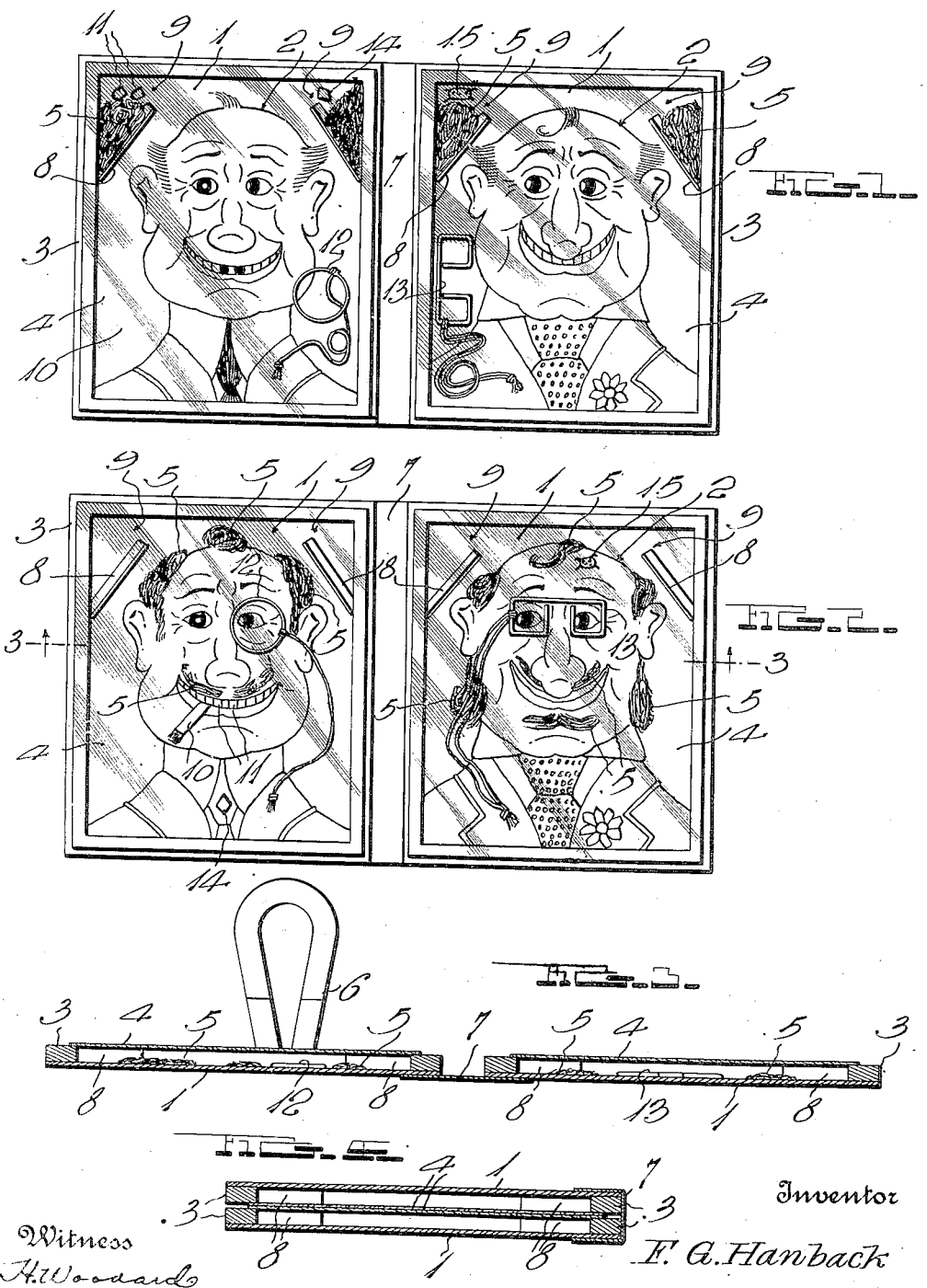
Witness
H. Woodard
Inventor
F. G. Hanback
By H. B. Willson & Co.
Attorneys Patented Aug. 11, 1925.

1,549,197

UNITED STATES PATENT OFFICE.

FRANK G. HANBACK, OF ALLEGANY, NEW YORK.

MAGNETIC TOY.

Application filed September 9, 1924. Serial No. 736,710.

*To all whom it may concern:*

Be it known that I, FRANK G. HANBACK, a citizen of the United States, residing at Allegany, in the county of Cattaraugus and State of New York, have invented certain new and useful Improvements in Magnetic Toys; and I do declare the following to be a full, clear, and exact description of the invention, such as will enable others skilled in the art to which it appertains to make and use the same.

My invention relates to improvements in toys of the type in which a magnet is used to move a magnetic substance or substances from one point to another, and the present disclosure has reference to such a toy in which an incomplete simulation is to be completed through the instrumentality of magnetism.

One object of the invention is to introduce, to the art of magnetic toys, a material which can be readily manipulated to either totally or partially complete an incomplete simulation, or possibly to form an entire simulation, said material consisting of a myriad of small, separate particles of basically magnetic metal, such as steel or iron filings, chips, shreds or the like. Such material is particularly well adapted for the representation of human or other hair, and by its use, comical, grotesque, artistic and other effects, may be produced in an amusing and entertaining manner, requiring considerable skill, imagination and creative action, and thus tending to develop genius which in many children remains dormant.

With the foregoing in view, the invention resides in the novel subject matter hereinafter described and claimed, the description being supplemented by the accompanying drawing.

Figure 1 is a plan view of one form of the toy, in which two characters are depicted, so that they may be completed to produce different effects or appearances, by manipulating the magnetic material, with an appropriate magnet.

Figure 2 is a view similar to Figure 1 but illustrating the characters changed greatly in appearance by depositing the magnetic material at different points.

Figure 3 is a sectional view as indicated by line 3—3 of Figure 2.

Figure 4 is a sectional view illustrating the manner in which the two halves of the toy may be folded upon each other.

In the form of the invention selected for illustration in the present application, each of the numerals 1 designates a base formed of card board or any other desired material. Printed, painted or otherwise formed on each of the bases 1, is a figure 2 which is incomplete, in that it is to be changed greatly by manipulating basically magnetic material, by means of a permanent or electrical magnet. In the present showing, the figures 2 are comical simulations of portions of human beings, but they might well represent any other animate being or inanimate object.

In the preferred form of construction a frame 3 of wood or any other desired material, is secured upon the edge portion of each of the bases 1, and a transparent cover 4 of celluloid or any other adequate material, is secured to each of the frames, so that each base and the cover 4 over the same are spaced apart by the frame and are held in fixed relation by the latter. Confined in the space between each base 1 and the superposed cover 4, is a quantity of basically magnetic material 5 which consists of a myriad of small, separate particles, such as chips, shreds or filings of iron or steel. The metal may if desired have its natural color or it may be coated so that it possesses another color or colors.

A magnet is used to move the material 5 to any desired points for obtaining different changes in the appearance of the figures 2 and while an electrical magnet may well be used for this purpose I have shown a permanent magnet which is indicated by the numeral 6 in Figure 3. By properly manipulating this magnet, desired quantities of the material 5 may be moved to numerous points, so that hirsute growth may be represented at any desired points on the figures 2, and it will be seen by comparing figures 1 and 2 that quite remarkable transformations may be produced in the appearance of such figures.

In the present showing, the toy is formed of two duplicate halves which are suitably hinged to each other, for instance by flexible strips 7 so that they may be folded upon each other when desired, as illustrated in Figure 4. Each of these sections is by preference rectangular and if desired I may provide appropriate pockets in certain corners, by extending partitions 8 diagonally across such corners, these partitions each extending from one side of the frame 3 to a point spaced from the next adjacent side, leaving throats 9 through which the material 5 may be moved into or out of the pockets.

In connection with the invention as above described, I prefer to use play pieces which may be moved by means of a magnet, to simulate habits, to represent the correction of physical defects, to produce a representation of personal adornment, etc. To illustrate, I have shown a cut out cigarette 10 which may be positioned in the mouth of the figure to simulate a habit. False teeth 11, a monocle 12 and eye glasses 13 have been shown to correct physical defects, and a representation 14 of a scarf pin has been illustrated to produce personal adornment. Also, if desired, to add an element of comedy to the toy, one or more simultations 15 of insects or the like may be provided. The parts 10, 11, 12, 13, 14 and 15 may all be formed in any desired manner, either totally or partially from basically magnetic material.

It will be seen from the foregoing that I have produced a simple and inexpensive toy for carrying out the object of the invention, and while excellent results may be obtained from the details disclosed, it is to be understood that within the scope of such invention as claimed, numerous modifications may be made. Furthermore, while I have merely illustrated the use of the material 5 in changing the appearance or completing an incomplete figure, it will be understood that in some instances, it may be left to the imagination of the player, to produce an entire figure, by the use of such material.

I claim:

1. A toy comprising an angular base, a transparent cover therefor, an angular frame spacing said base and cover apart and holding them in fixed relation, a wall between the cover and base extending from one side of the frame across a corner of the latter to a point spaced from the next adjacent side of said frame to provide a pocket, a quantity of magnetic material between the base and cover normally received in said pocket, said material consisting of a myriad of small separate particles, and a magnet for drawing the material into or from the pocket and for moving it to any desired point or points on the base.

2. A toy comprising an angular base, a transparent cover therefor, an angular frame spacing said base and cover apart and holding them in fixed relation, a wall between the cover and base extending from one side of the frame across a corner of the latter to a point spaced from the next adjacent side of said frame to provide a pocket, a quantity of magnetic material between the base and cover normally received in said pocket, and a magnet for drawing the material into or from the pocket and for moving it to any desired point or points on the base.

In testimony whereof I have hereunto affixed my signature.

FRANK G. HANBACK.